Patented July 8, 1941

2,248,634

UNITED STATES PATENT OFFICE 2,248,634

METHOD OF CONCENTRATION

Georg A. Krause, Munich, Germany, assignor of one-half to Gesellschaft für Linde's Eismaschinen A.-G., Hollriegelskreuth, near Munich, Germany No Drawing. Application October 2, 1937, Serial No. 167,031. In Germany October 10, 1936

5 Claims. (Cl. 99—199)

This invention relates to a method of concentrating aqueous solutions, mixtures, emulsions and suspensions and particularly concentrating natural juices, milk, extracts and the like with the production of a concentrate which upon dilution possesses the original taste, aroma and dietary value.

Heretofore, in evaporating water from watery solutions, mixtures, emulsions and suspensions, it has been general practice to heat the solution or the mixture up to the boiling point. If sensitive substances are contained in the solution, such as for instance aromatic substances, or solid material from fruit juices, coffee extracts, milk, and the like, the evaporation is carried out under lower pressure in order to lower the boiling temperature. Yet, such solutions, even if they are concentrated at very low pressures and at temperatures lower than room temperature, show deterioration. It is well known that the taste of concentrates of milk or fruit juices usually is entirely different from that of the original solution even though careful evaporation at low temperatures has been employed.

It is an object of the present invention to provide a new process of evaporating water from watery solutions or mixtures which permits one to minimize the difficulties encountered heretofore, especially with respect to amount of damage to the aroma. According to this invention the solution is first reduced to a content of dry substance of approximately 45-55% by freezing out part of the water. Thereafter it is subjected to a surface evaporation with avoidance of any boiling or cooking of the concentrate by an auxiliary gas f. i. hydrogen, nitrogen, air to the evaporating space above the surface of the concentrate. It has been found by very thorough experiments that under these conditions even highly aromatic juices, such as orange or raspberry juices, may be concentrated to 80% or more without adversely affecting the aroma, taste or dietary value of the original juice. That is, the concentrate has the same aroma, taste and vitamin content as the original solution. In practice of the present invention, also, no appreciable amounts of aroma could be determined in the water evaporated from the concentrate and collected by condensation.

The new process of the present invention is based on the following new knowledge concerning that which occurs during the concentrations; thorough experiments have found it to be correct. The deterioration in taste which aromatic substances may suffer during concentration by boiling is based in greatest part, not on a decomposition or destruction of the aromatic substances by reason of the boiling process, but upon the fact that aromatic substances are evaporated together with water vapors from the solution; the amount of these evaporating aromatic substances, generally esters or ethers which are not miscible or very slightly miscible with water, is determined by the proportion of the saturation pressure of the aromatic substance to that of the water. The damage to the taste consists therefore in the fact that at least one of the aroma forming compounds is lost. Contrary to the present point of view, that part of the aromatic substances which is volatile with water vapors is minimized only to a very small degree by lowering the temperature, because the proportion of the saturating pressure is very little dependent upon the temperature.

However, if one according to this invention, completely excludes boiling or cooking, and if one simply removes the water vapors by surface evaporation, a diffusion process takes place which dominates the simultaneous evaporation of aromatic substances and water; by means of diffusion both kinds of vapors must penetrate the border layer or film adjacent the surface of the liquid into the gaseous atmosphere from the surface of the liquid. By this diffusion process in the gas atmosphere, immediately after the escape of the vapors from the solution a separation takes place of the carried up aromatic substances which is in proportion to the saturation pressure thereof and to that of the water vapor pressure; this separation is, therefore, proportional to their diffusion velocities. Inasmuch as water forms a very small molecule and the aromatic substances a very large molecule, the difference of the diffusion velocities, and, therefore, the separating effect of this diffusion process, is very considerable.

Nevertheless, even in retarded evaporating processes, parts of the aroma are lost during the evaporation. Thus, a solution which is brought from about 10% to 80% solids only by evaporation from the original concentration, is already very badly damaged in aroma and content of other valuable substances. Only by preconcentration of the liquid according to this invention, that is, to remove the main part of the water in form of ice and then subject the concentrate, which has now 45-55% solids, to an evaporating process is it possible to make concentrates which, after dilution to the original concentration, can not be distinguished from a fresh juice. This success is based on the presently acquired knowledge that although in evaporating processes the losses of valuable substances, although in themselves small, are proportional closely to the amount of water which has to be evaporated. Now if according to the invention the amount of water which has to be evaporated is reduced by previous cold concentration to a fraction of the total amount of water to be removed, the losses may be reduced to an almost unnoticeable amount.

In order to carry out the cold concentration which represents the first step of the process according to this invention, any apparatus known for this purpose and any known working method may be applicable. In solutions very sensitive to mechanical disturbance a process may be preferred in which no stirring apparatus is present and has a beating effect upon the solution.

The evaporation following the cold freezing has opened up a new knowledge; that is, that the favorable effect of the evaporation is based on a diffusion process and, therefore, it also opens a new form of procedure of carrying this out. The relation of the diffusion velocities of two vapors in an indifferent auxiliary gas is practically independent of its nature, of its pressure, of its temperature and the length of the diffusion path. (See, for instance, Jellinek, "Lehrbuch der physikalischen Chemie" Band II, Seite 608 ff.)

It is concluded, therefore, that the separating action of the diffusion process is not reduced even if one raises the diffusion velocity of the water vapors, which determine the concentration velocity, by proper choice of the diffusion conditions, to the highest possible value. According to the laws of the diffusion of gases, the diffusion velocity rises with decreasing pressure of the auxiliary gas, with the temperature, with the partial pressure differences at the ends of the diffusion path, with the shortening of the diffusion path and finally with the enlargement of the diffusion cross section.

The evaporation, therefore, according to the new process, is carried out in such a manner that a very large surface is provided in order to obtain a large diffusion cross section of the solution to be concentrated, that the pressure of the auxiliary gas is chosen preferably relatively low and that the diffusion path is kept very short, for instance, in such a manner that the water vapors evaporating from the solution are taken away in short intervals from the liquid surface by condensation, adsorption or absorption. Another possibility to shorten the diffusion path in the indifferent accelerating gas rests in this, that the auxiliary gas is carried with much larger velocity over the solution to be concentrated. According to the well known hydro-dynamic laws the quiescent border layer of the gas atmosphere on the surface of the solution in which most of the diffusion takes place decreases in thickness with increasing gas velocity. In the remaining gas space the diffusion process is repressed on account of turbulent motion occurring therein.

The partial pressure difference of the diffusion may be increased by increasing the evaporating temperatures, however, only to such a degree as is permitted by the thermic sensitiveness of the solution to be evaporated. One can, according to the present invention, raise the evaporating temperature higher than heretofore used in original juices in cooking procedures because the aroma losses are considerably diminished by the diffusion process and are practically independent of the temperature, contrary to the boiling process.

The aroma losses may even be completely suppressed if the auxiliary gas is moved toward the surface from which the evaporation takes place with a velocity which is equal to or higher than the velocity of the aroma vapors, because under such conditions the latter can not leave the surface border layer.

So, also, the concentration velocity is diminished because the diffusion of the water vapors is repressed. Since, however, the diffusion velocity of aromatic substances amounts to only approximately one-tenth of the diffusion velocity of the water vapors, it is sufficient to keep the velocity of the gas which flows counter-current to the diffusing vapors, at this small fraction of the diffusion velocity of the water vapor, whereby the amount of water diffusing in a unit of time is reduced only about 10%, whereas, however, the aromatic substances are retained completely. The gas stream does not have to be vertical to the liquid surface; it can form with it angles deviating from a right angle, and, if necessary, may be carried in a cross stream to the vapors in state of diffusion. In carrying out the evaporating concentration, one has to take into consideration that through the evaporating process an especially strong concentration in the surface layer of the evaporating solution takes place which may cause skin formation, etc.; therefore, the process is to be carried out in such a manner that no skin formation takes place by, for instance, slowly rotating discs which are immersed partly into the solution and thus coated with a liquid film. After concentration in the gas space of the liquid film, the concentrate so carried is again brought into contact with the main quantity of the solution, thereby losing the concentrate by dissolving it in the liquid. In a similar manner plates which part of the time are immersed in the solution and part of the time suspended in the gas space above the surface of the liquid and which after the desired concentration of the solution may be immersed again into solution, may be employed. Additionally, the heat necessary for evaporating the water must not be added by heating the solution due to the viscosity of the solution and the danger of the skin formation but is applied in an especial effective way by the use of a preheated auxiliary gas. Such a manner of working gives also the further advantage that the solution itself stays cooler than the gas space in which the diffusion process takes place. Therefore, thermo diffusion favors the retaining of the aroma substances and the absolute diffusion velocity is increased with the temperature of the gas.

The new process may be used for concentrations of any kind of juices, such as fruit juices, of milk, meat extracts, etc.

In the claims the term "solution" includes true solutions as well as colloidal solutions such as emulsions and suspensions.

What is claimed is:

1. The method of concentrating aqueous solutions which comprises freezing the solution to solidify at least a portion of the water thereof, separating a concentrate from the ice so formed and thereafter removing additional water from the concentrate by surface evaporation while maintaining the temperature of the concentrate considerably below its boiling point at the pressure employed.

2. The method of concentrating aqueous solutions containing aroma and sapid materials which comprises freezing the solution to solidify at least a portion of the water thereof, separating a concentrate from the ice so formed and thereafter removing an additional portion of water by evaporation without ebullition by contacting the surface of the concentrate with a moving auxiliary gas whereby moisture is removed therefrom but the valuable aroma and sapid materials retained therein.

3. The method of concentrating aqueous solutions containing aroma and sapid materials which comprises freezing the solution to solidify at least a portion of the water thereof, separating a concentrate from the ice so formed and thereafter removing an additional portion of water by evaporation without ebullition by contacting the surface of the concentrate with a moving auxiliary gas at a velocity at least exceeding the partial diffusion pressure of the valuable aroma and sapid materials of the concentrate.

4. The method of concentrating aqueous solutions containing aroma and sapid materials which comprises freezing the solution to solidify at least a portion of the water thereof, separating a concentrate from the ice so formed, forming the concentrate into a film and evaporating additional water therefrom without ebullition and in the presence of an auxiliary gas.

5. In the concentration of solutions partially concentrated by freezing and containing aroma and sapid materials the step which comprises slowly evaporating the partially concentrated solution without boiling and cooking the same whereby a film forms upon the surface of the solution that is permeable to water but substantially impermeable to the aroma and sapid materials.

G. A. KRAUSE.